US008014938B2

(12) United States Patent
Livshiz et al.

(10) Patent No.: US 8,014,938 B2
(45) Date of Patent: Sep. 6, 2011

(54) FUEL EFFICIENCY DETERMINATION FOR AN ENGINE

(75) Inventors: Michael Livshiz, Ann Arbor, MI (US); John P. Blanchard, Holly, MI (US); John L. Lahti, Novi, MI (US); Anthony H. Heap, Ann Arbor, MI (US)

(73) Assignee: GM Global Technology Operations LLC

( * ) Notice: Subject to any disclaimer, the term of this patent is extended or adjusted under 35 U.S.C. 154(b) by 0 days.

(21) Appl. No.: 11/612,704

(22) Filed: Dec. 19, 2006

(65) Prior Publication Data

US 2007/0156325 A1 Jul. 5, 2007

Related U.S. Application Data

(60) Provisional application No. 60/755,001, filed on Dec. 29, 2005.

(51) Int. Cl.
*G06F 19/00* (2006.01)

(52) U.S. Cl. ... 701/123; 701/103; 701/110; 123/406.45; 73/114.53; 702/182

(58) Field of Classification Search .................. 123/494, 123/435, 478, 480, 336, 339, 349, 350, 352, 123/361, 346, 403, 406.45, 406.47; 701/101, 701/102, 123, 110, 115; 73/114.52, 114.53; 702/182, 183
See application file for complete search history.

(56) References Cited

U.S. PATENT DOCUMENTS

| | | | | | |
|---|---|---|---|---|---|
| 4,305,364 | A * | 12/1981 | Stuckas | 123/676 |
| 4,905,649 | A | 3/1990 | Washino et al. | |
| 5,107,815 | A * | 4/1992 | Van Duyne | 123/435 |
| 5,342,258 | A * | 8/1994 | Egyed | 475/281 |
| 5,394,849 | A * | 3/1995 | Tomisawa | 123/435 |
| 5,423,208 | A * | 6/1995 | Dudek et al. | 73/117.3 |
| 5,531,193 | A * | 7/1996 | Nakamura | 123/90.15 |
| 5,791,145 | A * | 8/1998 | Freen | 60/603 |
| 5,829,247 | A * | 11/1998 | Zhang | 60/285 |
| 6,155,043 | A * | 12/2000 | Zhang et al. | 60/284 |
| 6,196,197 | B1 * | 3/2001 | Yamada et al. | 123/480 |
| 6,205,973 | B1 | 3/2001 | Bauer et al. | |
| 6,584,956 | B2 * | 7/2003 | Machida | 123/406.47 |
| 6,594,579 | B1 * | 7/2003 | Lowrey et al. | 701/123 |
| 6,691,506 | B2 * | 2/2004 | Shimizu | 60/284 |
| 2002/0189563 | A1 * | 12/2002 | Muraki et al. | 123/90.18 |

FOREIGN PATENT DOCUMENTS

| | | | |
|---|---|---|---|
| DE | 3833123 | A1 | 4/1989 |
| DE | 19850581 | C1 | 2/2000 |

OTHER PUBLICATIONS

Baolong Zhou, "Internal Combustion Engine Technology", Published Jan. 2005, China Machine Press; pp. 19-21, 24-25.
Translated Copy of Baolong Zhou, "Internal Combustion Engine Technology", Published Jan. 2005, China Machine Press; pp. 1-7.

* cited by examiner

*Primary Examiner* — Wills R Wolfe, Jr.
*Assistant Examiner* — Johnny H Hoang

(57) ABSTRACT

A module that calculates power loss for an internal combustion engine includes an air intake calculation module that determines a final air per cylinder (APC) value. A fuel mass rate calculation module that determines a fuel mass rate value based on the final APC value. A power loss calculation module that determines a power loss value for the internal combustion engine based on the fuel mass rate value.

16 Claims, 4 Drawing Sheets

FUEL EFFICIENCY DETERMINATION FOR AN ENGINE

CROSS-REFERENCE TO RELATED APPLICATIONS

This application claims the benefit of U.S. Provisional Application No. 60/755,001, filed on Dec. 29, 2005. The disclosure of the above application is incorporated herein by reference.

FIELD

The present disclosure relates to engine control systems, and more particularly to an engine control system that determines a fuel efficiency of an internal combustion engine based on a power loss of the engine.

BACKGROUND

Vehicles include an internal combustion engine that generates drive torque. More specifically, the engine draws in air and mixes the air with fuel to form a combustion mixture. The combustion mixture is compressed within cylinders and is combusted to drive pistons that are disposed within the cylinders. The pistons drive a crankshaft that transfers drive torque to a transmission and a drivetrain.

Vehicle manufacturers typically use a dynamometer to evaluate vehicle performance. For example, a dynamometer may determine optimal engine torque output for a range of engine speeds. However, actual torque output may be different than the optimal torque output generated by the vehicle in controlled conditions. More specifically, the actual torque output may be affected by external conditions including, but not limited to, air temperature, humidity, and/or barometric pressure.

SUMMARY

The present disclosure provides a fuel efficiency estimation system for determining a fuel efficiency of an internal combustion engine. The system includes a first module that determines a final air intake value and a second module that determines a fuel mass rate value based on the final air intake value. A third module determines the power loss for the internal combustion engine based on the fuel mass rate value. A fuel efficiency of the engine is determined based on the power loss.

In other features, the first module includes a first sub-module that generates an initial air intake value based on at least one of an engine speed value, an engine torque value and an engine coolant temperature value. The first module further includes a second sub-module that outputs a current iterative air intake value based on at least one of the engine speed value, the engine torque value and the coolant temperature value.

In other features, the first module further includes a third sub-module that determines a spark advance value, a fourth sub-module that determines an intake and exhaust cam phaser position value and a fifth sub-module that determines an air/fuel ratio. The spark advance value, the intake and exhaust cam phaser positions values and the air/fuel ratio are calculated based on the current iterative air intake value, the engine speed value and the coolant temperature value.

In still other features, the second sub-module calculates the current iterative air intake value based on the spark advance value, the intake and exhaust cam phaser position values and the air/fuel ratio value.

In yet other features, the second sub-module determines a difference between the current iterative air intake value and a prior iterative air intake value. The second sub-module outputs a final iterative air intake value when the difference is less than a predetermined threshold value. The second sub-module updates the iterative air intake value when the difference is greater than the predetermined threshold value.

Further areas of applicability will become apparent from the description provided herein. It should be understood that the description and specific examples are intended for purposes of illustration only and are not intended to limit the scope of the present disclosure.

DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. As used herein, the term module or device refers to an application specific integrated circuit (ASIC), an electronic circuit, a processor (shared, dedicated, or group) and memory that executes one or more software or firmware programs, a combinational logic circuit, and/or other suitable components that provide the described functionality.

According to the present disclosure, a fuel efficiency of an engine is calculated as a function of a power loss of the engine, which is based on the difference between an optimal power output value and an estimated power output value. More specifically, the estimated power is calculated during a stable or steady-state engine condition based on current engine speed, engine torque and coolant temperature values.

Figure 1:
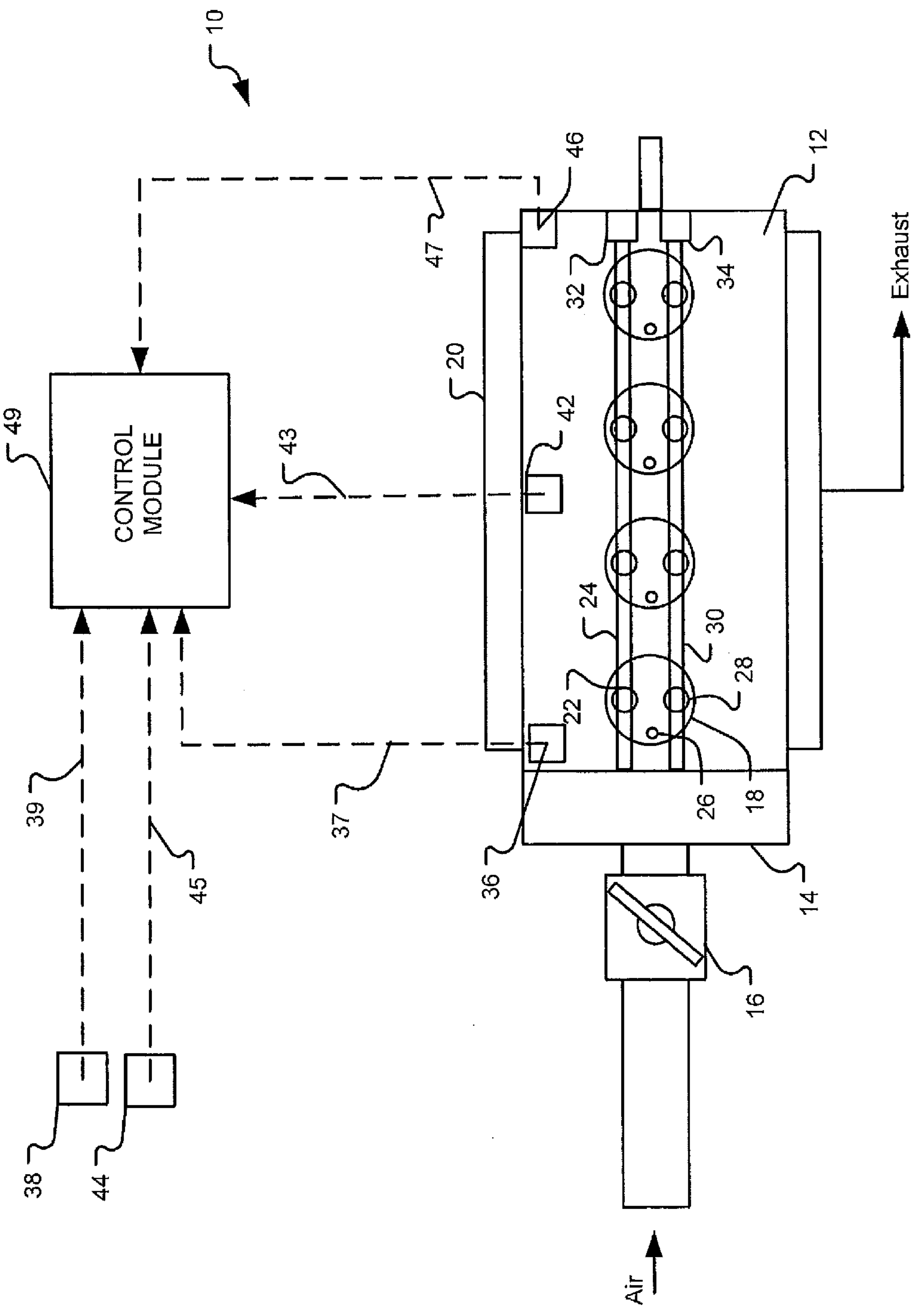
FIG. 1 is a functional block diagram of an engine system.

Referring now to FIG. 1, an engine system 10 includes an engine 12 that combusts an air/fuel mixture to produce drive torque. Air is drawn into an intake manifold 14 through a throttle 16. The throttle 16 regulates air flow into the intake manifold 14. The air is mixed with fuel and is combusted within cylinders 18 to produce drive torque. Although four cylinders are illustrated, it can be appreciated that the engine 12 may include additional or fewer cylinders 18. For example, engines having 2, 3, 5, 6, 8, 10 and 12 cylinders are contemplated.

A fuel injector (not shown) injects fuel that is combined with air to form an air/fuel mixture that is combusted within the cylinder 18. A fuel injection system 20 regulates the fuel injector to provide a desired air-to-fuel ratio within each cylinder 18. An intake valve 22 selectively opens and closes to enable the air/fuel mixture to enter the cylinder 18. The position of the intake valve is regulated by an intake cam shaft 24. A piston (not shown) compresses the air/fuel mixture within the cylinder 18. After the combustion event, an exhaust valve 28 selectively opens and closes to enable the exhaust gases to exit the cylinder 18. The position of the exhaust valve is regulated by an exhaust cam shaft 30. The piston drives a crankshaft (not shown) to produce drive torque. The crankshaft rotatably drives camshafts 24,30 using a timing chain (not shown) to regulate the timing of intake and exhaust valves 22, 28. Although dual camshafts are shown, a single camshaft may be used.

The engine 12 may include an intake cam phaser 32 and/or an exhaust cam phaser 34 that respectively regulate rotational timing of the intake and exhaust cam shafts 24, 30 relative to a rotational position of the crankshaft. More specifically, a phase angle of the intake and exhaust cam phasers 32, 34 may be retarded or advanced to regulate the rotational timing of the intake and exhaust cam shafts 24, 30.

A coolant temperature sensor 36 is responsive to the temperature of a coolant circulating through the engine 12 and generates a coolant temperature signal 37. A barometric pressure sensor 38 is responsive to atmospheric pressure and generates a barometric pressure signal 39. An engine speed sensor 42 is responsive to the engine speed and outputs an engine speed signal 43. A temperature sensor 44 is responsive to ambient temperature and outputs a temperature signal 45. An oil temperature sensor 46 is responsive to oil temperature and outputs an oil temperature signal 47. A control module 49 regulates operation of the engine system 10 based on the various sensor signals. The engine control module 49 selectively calculates a power loss of the engine system 10 and determines a fuel efficiency of the engine based thereon.

Figure 2:
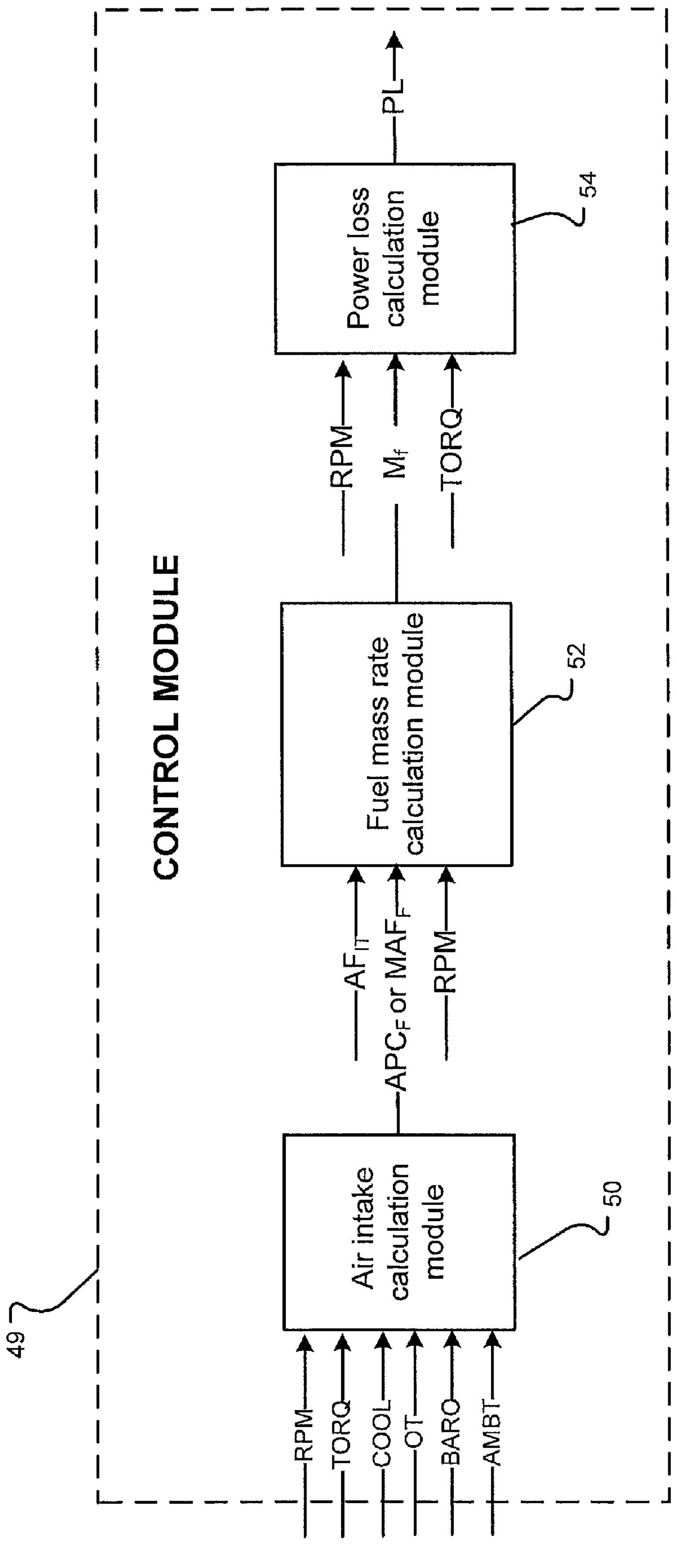
FIG. 2 is an exemplary block diagram of a control module that calculates a fuel efficiency of the engine system according to the present disclosure.

Referring now to FIG. 2, an exemplary embodiment of the control module 49 uses an engine torque value (TORQ), an engine speed value (RPM), a coolant temperature value (COOL), a barometric pressure value (BARO), an oil temperature value (OT) and an ambient temperature value (AMBT) as inputs to calculate power loss. More specifically, the TORQ, RPM, COOL, BARO, OT, and AMBT values may be current values determined based on, but not limited to, the signals from the sensors 36, 38, 42, 44, 46. In an alternate configuration, the TORQ, RPM, COOL BARO, OT and AMBT may be values determined by the control module 49 to calculate a theoretical power loss.

The control module 49 includes an air intake calculation module 50, a fuel mass rate calculation module 52 and a power loss calculation module 54. The air intake calculation module 50 determines a final mass of air-per-cylinder ($APC_F$) and/or a final mass air flow rate ($MAF_F$). More specifically, $APC_F$ and $MAF_F$ are based on the same inputs TORQ, RPM, COOL, BARO, OT and AMBT. The relationship between $APC_F$ and $MAF_F$ is shown in the following equation:

$$MAF_F = APC_F \times \mathrm{RPM} \times N \times k_{conv}$$

where N, is the number of cylinders 18 of the engine 12 and $k_{conv}$ is a constant determined based on a unit conversion. For ease of discussion, $APC_F$ is used in context to further illustrate the present disclosure.

The fuel mass rate calculation module 52 determines a fuel mass rate ($M_f$) based on $APC_F$, RPM, and $AF_{IT}$. More specifically, the $M_f$ may be based on the following equation:

$$M_f = \frac{APC_F \times RPM}{k \times AF_{IT}}$$

The constant k is a predetermined value that may vary according to different engine systems. $AF_{IT}$ is a calculated air fuel ratio that is discussed in further detail below.

The power loss calculation module 54 determines a power loss value (PL) based on $M_f$, RPM, and TORQ. More specifically, the PL may be based on the following equation:

$$PL = \left[\frac{M_f}{M_{opt}} \times TORQ_{opt} \times RPM_{opt}\right] - [TORQ \times RPM]$$

$TORQ_{opt}$, $RPM_{opt}$ and $M_{opt}$ are the optimal engine torque, optimal engine speed, and optimal fuel mass flow rate values, respectively, and can be selected to represent one operating point for the engine at one reference coolant temperature and one reference barometric pressure. Alternatively, the values of $TORQ_{opt}$, $RPM_{opt}$ and $M_{opt}$ can be determined from pre-stored look-up tables based on the current coolant temperature (COOL) and current barometric pressure (BARO). The power loss can also be evaluated using different $TORQ_{opt}$ and $M_{opt}$ for each RPM. More specifically, $RPM_{opt}$ set equal to RPM and the values $TORQ_{opt}$ and $M_{opt}$ are determined from a pre-stored look-up based on RPM.

Various embodiments of the control module 49 may include any number of modules. The modules shown in FIG. 2 may be combined and/or partitioned further without departing from the present disclosure.

Figure 3:
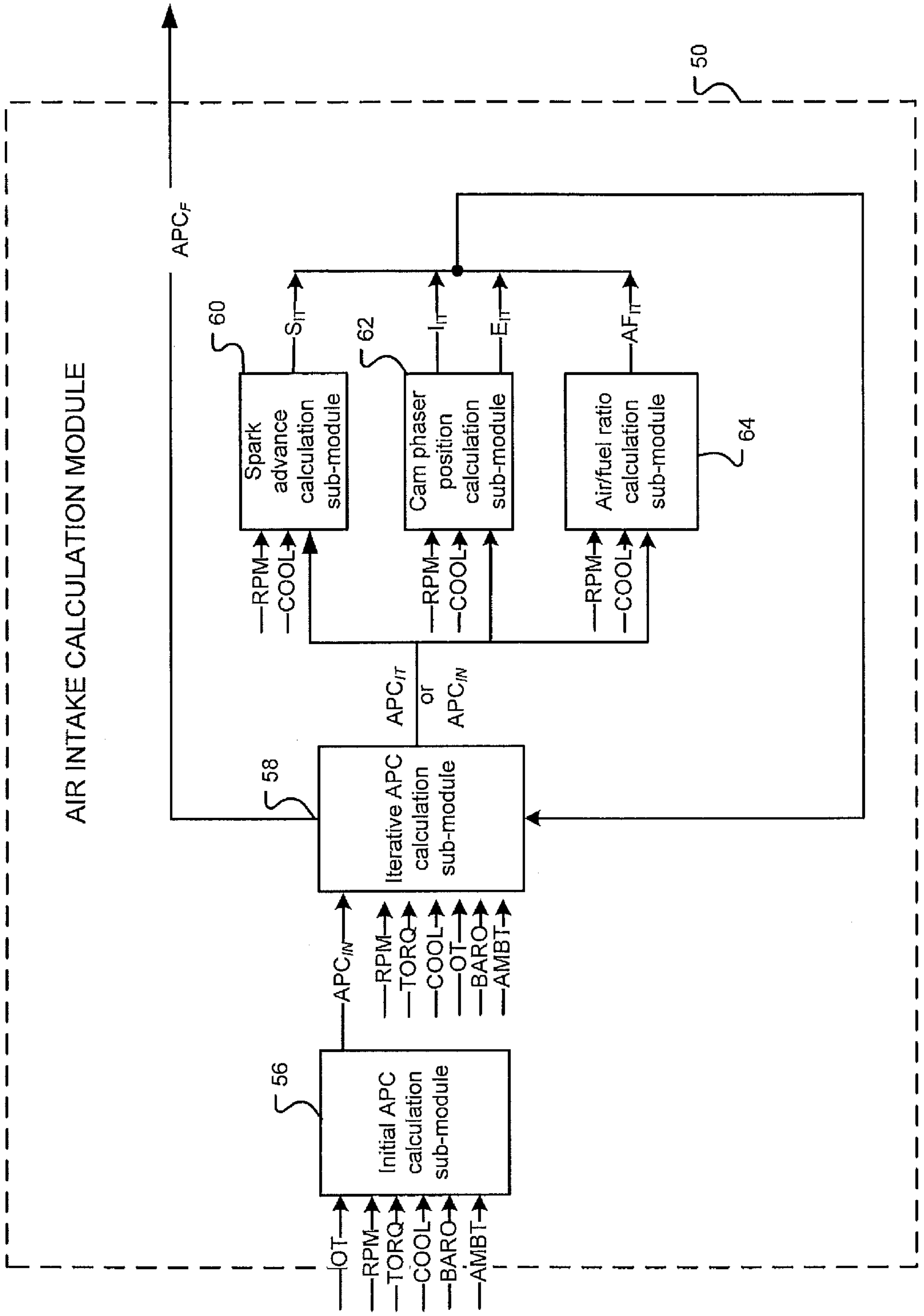
FIG. 3 is an exemplary block diagram of an air intake calculation module according to the present disclosure.

Referring now to FIG. 3, an exemplary embodiment of the calculation module 50 including an initial calculation APC sub-module 56, an iterative APC calculation sub-module 58, a spark advance calculation sub-module 60, a cam phaser position calculation sub-module 62 and an air/fuel ratio calculation sub-module 64. The initial APC calculation sub-module 56 outputs an initial APC ($APC_{IN}$) based on TORQ, RPM, COOL, BARO, OT, and AMBT. For example, $APC_{IN}$ may be based on the following inverse model torque equation:

$$APC_{IN} = T_{APC}^{-1}(\mathrm{TORQ, RPM, COOL}, S_{IN}, I_{IN}, E_{IN}, AF_{IN}, OT, BARO, T)$$

$S_{IN}$, $I_{IN}$, $E_{IN}$, and $AF_{IN}$ are initial values for spark advance, intake cam phaser position, exhaust cam phaser position and air/fuel ratio, respectively. The $S_{IN}$, $I_{IN}$, $E_{IN}$, and $AF_{IN}$ maybe predetermined lookup table values that are accessed as a function of TORQ, RPM, COOL, BARO, OT and AMBT.

The iterative APC calculation sub-module 58 determines an iterative APC ($APC_{IT}$) until the engine is stable and then outputs $APC_F$ to the fuel mass rate calculation module 52. More specifically, $APC_{IT}$ may be based on the following inverse model torque equation:

$$APC_{IT} = T_{APC}^{-1}(\mathrm{TORQ, RPM, COOL}, S_{IT}, I_{IT}, E_{IT}, AF_{IT}, OT, BARO, T)$$

TORQ, RPM, COOL, OT, BARO, and AMBT are the current values as provided by the respective sensors. $S_{IT}$, $I_{IT}$, $E_{IT}$, and $AF_{IT}$ are iterative values for spark advance, intake cam phaser position, exhaust cam phaser position and air/fuel ratio, respectively. The iterative APC calculation sub-module 58 outputs $APC_F$ when the engine is stable. More specifically, engine stability is determined when a difference between a prior $APC_{IT}$ and the current $APC_{IT}$ is less than a predetermined value. The $APC_F$ is set equal to the current $APC_{IT}$. The spark advance calculation sub-module 60 outputs $S_{IT}$ based on the current $APC_{IT}$, RPM and COOL. The cam phaser position calculation sub-module 62 outputs $I_{IT}$ and $E_{IT}$ based on the current $APC_{IT}$, RPM and COOL. The AF ratio calculation sub-module 64 outputs $AF_{IT}$ based on the $APC_{IT}$, RPM, and COOL.

Various embodiments of the calculation module 50 may include any number of sub-modules. The sub-modules shown in FIG. 3 may be combined and/or partitioned further without departing from the present disclosure.

Figure 4:
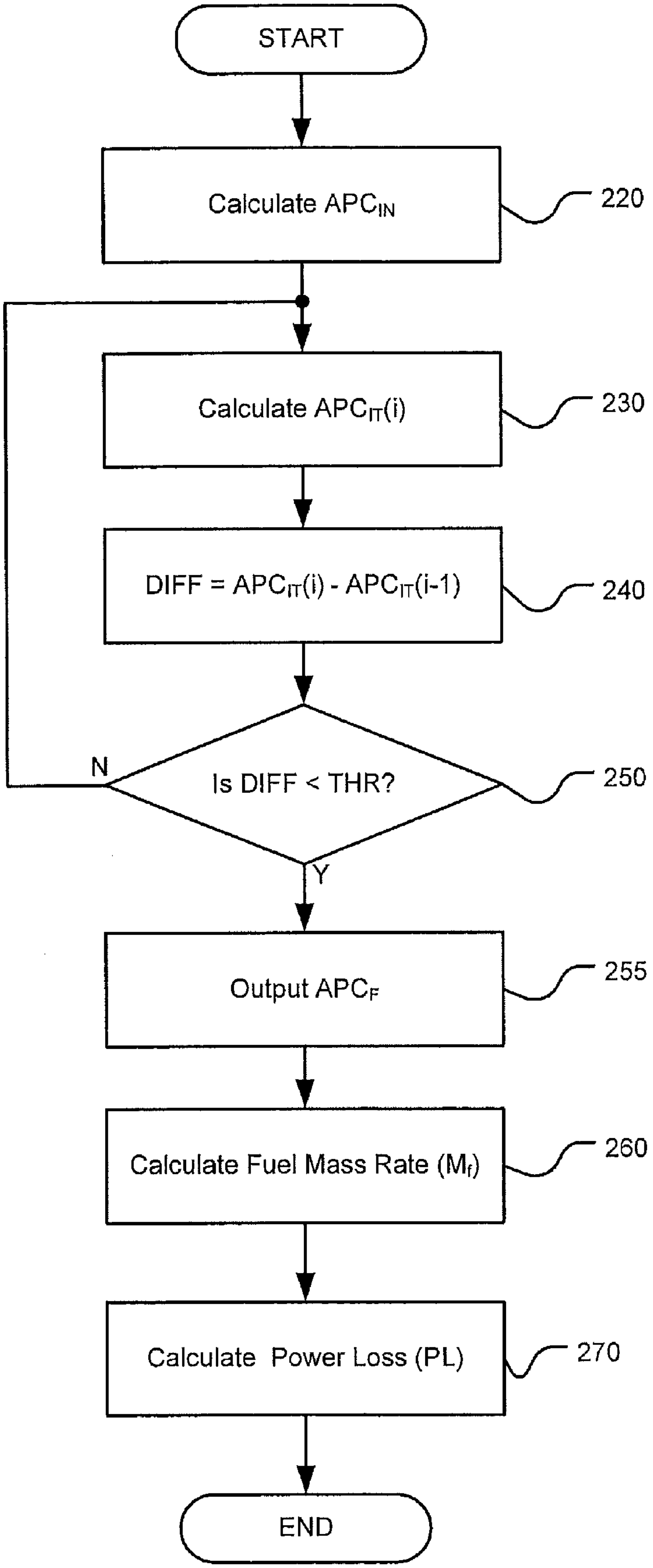
FIG. 4 is a flowchart illustrating exemplary steps executed by the fuel efficiency control according to the present disclosure.

Referring now to FIG. 4, exemplary steps that are executed to calculate power loss will be described in detail. In step 220, control determines $APC_{IN}$. In step 230, control determines a current $APC_{IT}$ ($APC_{IT}$(i), where i is a time step) based on $APC_{IN}$ or a prior iterative APC ($APC_{IT}$(i-1)). More specifically, the first iterative APC calculation is based on $APC_{IN}$ and subsequent iterative APC calculations are based on $APC_{IT}$(i-1).

In step 240, control determines a difference (DIFF) between $APC_{IT}$(i) and $APC_{IT}$(i-1). In step 250, control determines whether DIFF is less than a predetermined threshold value (THR). If DIFF is greater than THR, the iterative solution is deemed to be at an intermediate state and control loops back to step 230. If DIFF is less than THR, the iterative solution is considered complete and control proceeds to output $APC_F$ in step 255. More specifically, $APC_F$ is set equal to or otherwise provided as $APC_{IT}$(i). In step 260, control calculates $M_f$ based on $APC_F$, $AF_{IT}$ and RPM values. In step 270, control calculates a power loss (PL) value based on $M_f$, TORQ and RPM values and control ends. Control can subsequently determine an instantaneous fuel efficiency of the engine based on PL.

It is also anticipated that the present disclosure can be implemented using an engine mass air flow (MAF), as opposed to APC. In this case, APC is substituted for using the determined MAF.

It is further anticipated that the present disclosure can be modified for implementation with diesel engine systems. For example, in the case of a diesel engine system, APC is not determined. Instead, an engine torque model is provided, which is primarily based on a fuel mass flow rate. The inverse torque model, in this case, provides an estimate of the required fuel mass flow rate.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A fuel efficiency estimation system for determining a fuel efficiency of an internal combustion engine comprising:

a first module that determines a current iterative intake air mass value provided to said engine and compares said current iterative intake air mass value to a previous iterative intake air mass value, said first module providing said current iterative intake air mass value as a final intake air mass value when a difference between said current iterative intake air mass value and said previous iterative intake air mass value is less than a predetermined threshold value;

a second module that determines a fuel mass rate value based on said final air intake mass value; and a third module that determines a power loss for the internal combustion engine based on said fuel mass rate value, wherein a fuel efficiency of the engine is determined based on said power loss.

2. The fuel efficiency estimation system of claim 1 wherein said first module comprises a first sub-module that generates an initial intake air mass value based on at least one of an engine speed value, an engine torque value and an engine coolant temperature value.

3. The fuel efficiency estimation system of claim 2 wherein said first module further comprises a second sub-module that outputs said current iterative intake air mass value based on at least one of said engine speed value, said engine torque value and said coolant temperature value.

4. The fuel efficiency estimation system of claim 3 wherein said first module further comprises:

a third sub-module that determines a spark advance value;

a fourth sub-module that determines an intake and exhaust cam phaser position value; and a fifth sub-module that determines an air/fuel ratio.

5. The fuel efficiency estimation system of claim 4 wherein said spark advance value, said intake and exhaust cam phaser positions values and said air/fuel ratio are calculated based on said current iterative intake air mass value, said engine speed value and said coolant temperature value.

6. The fuel efficiency estimation system of claim 5 wherein said second sub-module calculates said current iterative intake air mass value based on said spark advance value, said intake and exhaust cam phaser position values and said air/fuel ratio value.

7. The fuel efficiency estimation system of claim 3 wherein said second sub-module determines said difference between said current iterative intake air mass value and said previous iterative intake air mass value.

8. The fuel efficiency estimation system of claim 7 wherein said second sub-module outputs said final intake air mass value when said difference is less than said predetermined threshold value.

9. The fuel efficiency estimation system of claim 7 wherein said second sub-module updates said current iterative intake air mass value when said difference is greater than said predetermined threshold value.

10. A method of determining a fuel efficiency of an internal combustion engine, comprising:

determining a current iterative intake air mass value provided to said engine;

comparing said current iterative intake air mass value to a previous iterative intake air mass value;

providing said current iterative intake air mass value as a final intake air mass value when a difference between said current iterative intake air mass value and said previous iterative intake air mass value is less than a predetermined threshold value determining a fuel mass rate value based on said final intake air mass value;

calculating a power loss of the internal combustion engine based on said fuel mass rate value; and determining the fuel efficiency based on said power loss.

11. The method of claim 10 further comprising determining an initial intake air mass value based on at least one of an engine speed value, an engine torque value and an engine coolant temperature value.

12. The method of claim 11 further comprising determining said current iterative intake air mass value based on at least one of said engine speed value, said engine torque value and said coolant temperature value.

13. The method of claim 12 further comprising:

determining a spark advance value;

determining a intake and exhaust cam phaser position values; and determining an air/fuel ratio.

14. The method of claim 13 wherein said spark advance value, said intake and exhaust cam phaser positions values and said air/fuel ratio are calculated based on at least one of said current iterative intake air mass value, said engine speed value and said coolant temperature value.

15. The method of claim 14 wherein said current iterative intake air mass value is based on at least one of said spark advance value, said intake and exhaust cam phaser position values and said air/fuel ratio value.

16. The method of claim 10 wherein said current iterative intake air mass value is updated if said difference is greater than said predetermined threshold value.

* * * * *